United States Patent Office 3,481,887
Patented Dec. 2, 1969

3,481,887
THERMALLY ACTIVATED FOAMING COMPOSITIONS
T. O. Paine, Deputy Administrator of the National Aeronautics and Space Administration with respect to an invention of Charles E. Welling
No Drawing. Continuation-in-part of application Ser. No. 553,264, May 25, 1966. This application Sept. 19, 1968, Ser. No. 761,007
Int. Cl. C08g 22/44
U.S. Cl. 260—2.5                        6 Claims

ABSTRACT OF THE DISCLOSURE

A storage stable, thermally actuatable, foamable composition comprising a mixture of a hydroxyl terminated prepolymer, 4,4'-diphenyl methane diacyl azide, bisphenol adduct of 4,4'-diphenyl methane diisocyanate, a surfactant and a catalyst.

---

The invention described herein was made in the performance of work under a NASA contract and is subject to the provisions of Section 305 of the National Aeronautics and Space Act of 1958, Public Law 85–568 (72 Stat. 435; 42 U.S.C. 2457).

This application is a continuation-in-part of application Ser. No. 553,264, filed May 25, 1966, now abandoned.

The invention relates to compositions for producing foamed materials and relates in particular to storage-stable compositions that may be spread as a paste or molded into sheets for employment as the erecting and rigidizing mechanism of flexible thin sheet solar collectors and the like. In the case of the reactants normally used for commercial polyurethane foams, the reaction rates are necessarily high to avoid bubble coalescene and collapse. Starting at room temperature, foam rise and cure usually occur in about two minutes after mixing the reactants. This typifies the ready reactivity of polyurethane foaming systems. High reactivity is desirable in foaming, but is a barrier to obtaining long delayed foaming after mixing of the ingredients. Previous approaches that have been explored to delay foaming after mixing the reactants have included rapid chilling and holding of the compositions at quite a low temperature, and the use of marginally stable derivatives of isocyanates or chemically blocked isocyanates that can be caused to disassociate when desired. Some study has also been made of mixed solid reactants, depending upon the generally low rates of solid-solid reaction and availability of a number of polyisocyanates with melting points covering a range above room temperature.

In principle, in a two-reactant system, one reactant must be inert under storage conditions to yield a storage-stable system of the mixed reactants. Also, for the system to be useful there must be a way to activate the inert reactant.

Studies of space power systems utilizing solar energy have shown that one piece solar energy concentrators, because of their relatively good optics, will have the smallest size for a given power level. However, power requirements dictate a diameter larger than the diameter of any launch vehicle presently used or contemplated for use in space exploration. One obvious solution to this problem is an expandable concentrator that can be compactly packaged for launch and then deployed for use in space and much effort has gone into the development of such expandable types of solar concentrators which include the inflatable-rigidized concentrators. One problem that exists in the use of inflatable-rigidized concentrators, however, has been the destructive effect of micrometeorite punctures on such concentrators which lead to the loss of inflation medium and distortion in the concentrator. One solution to this problem appears to be the use of rigidizing material such for example polyurethane foam backing for the reflective concentrator.

An example of a suitable paraboloidal reflector for electromagnetic waves which is rigidized by polyether urethane foam is disclosed in U.S. Patent No. 3,202,998 and asigned to the National Aeronautics and Space Administration. In this patented device, the paraboloidal reflector has a preformed layer of polyether urethane foam attached thereto prior to being folded and packaged into a suitable carrier vehicle for being placed in orbit about the earth or other celestial bodies. This patented device is readily foldable compressed at 12:1 ratio for packaging within a low volume internal compartment of the carrier vehicle. In order to achieve maximum concentrator size in a minimum storage space or a larger compression ratio for packaging a concentrator within a launch vehicle, it is desirable that the foam rigidizing material be produced after erection or inflation of the concentrator in the spatial environment. The present invention is thus concerned with a suitable storage-stable foam generating composition capable of being self-adhered to the flexible film material used to make up a solar concentrator and capable of generating rigidized foam backing for the concentrator in the spatial environmental use of the concentrator.

Accordingly, an object of the present invention is a storage-stable foam generating composition for use in rigidizing solar concentrators.

Another object of the present invention is the new and novel thermally activated foam generating composition that requires no mixing at the foam generating site.

Yet another object of the present invention is a new and novel method of rigidizing an expandable structure.

According to the present invention, the foregoing and other object are obtained by providing a storage-stable foam generating composition that may be applied either by spraying or by molding the composition into suitable sheets and securing the sheets to an expandable structure to provide thermal activated self-rigidizing of the expandable structure when subjected to a predetermined thermal environment.

A more complete appreciation of the invention and many of the attendant advantages thereof will be readily apparent as the same becomes better understood by reference to the following detailed description of the invention.

The present invention consists essentially in the unique combination of ingredients for multicomponent storage-stable formulations capable of reacting to form a structurally useful polyurethane foam by a unique heat-initiated process. The foaming process involves a somewhat complex assembly of sequential and simultaneous chemical reactions and changes of physical state that are reproducible and subject to control by the methods devised herein. The process is shaped to meet the dual requirements of operability under the space vacuum and solar radiation conditions of an earth orbit and of production of rigid foam that is self-bonded to the surface to be rigidized.

Thus, the present invention involves the composition and method of rigidizing expandable structures in the space environment. A storage-stable composition is provided that, in ground assembly, may be spread as a paste on flexible portions of a structure such as the large areas of metallicized plastic film that might be employed in orbiting solar collectors or concentrators. The normal composition of the present invention is capable of undergoing a rapid foaming process in space when heated by solar radiation or otherwise to an initiating temperature of about 180° F. The foaming process is complete within one or two minutes, yielding rigid, open-cell urethane foam generally in the density range of 3–10 lb./ft.$^3$. The foamable composition is adjusted by novel formulation to process requirements so that a predictable, acceptable, overall heat release occurs in the process.

In operation, the novel foamable composition of the present invention is exemplified by the following ingredients:

|  | Weight percent |
|---|---|
| Hydroxyl terminated prepolymer | 55.4 |
| 4,4'-diphenyl methane diacyl azide | 16.5 |
| Bisphenol adduct of 4,4'-diphenyl methane diisocyanate | 26.0 |
| Surfactant | 1.6 |
| Catalyst | 0.5 |
|  | 100.0 |

The prepolymer shown above must possess a viscosity of about 45,000 to 75,000 centipoise at 110° C. as measured by a Brookfield viscosimeter, to achieve frothing and foam rise when the total composition is formed in high vacuum. A suitable prepolymer may be produced by reacting 0.3 equivalent 4,4'-diphenyl methane diisocyanate with one equivalent of a polyether polyol which is an α-methyl glucoside polymer of propylene oxide having an "OH" equivalent weight of about 150. Polyols of this type are well known and readily available and can be formulated as desired by those skilled in the art. One specific example of a polyol of this type is more fully described in the article entitled "Effect of Molecular Structure on Properties of Highly Cross-Linked Urethane Polymers" by W. C. Darr et al. and published in Industrial and Engineering Chemistry Product Research and Development; vol. 2, no. 3, September 1963, pp. 194–199. A reaction time of two hours at 120–125° C. is suitable. The surfactant employed may be any suitable surfactant such for example alkyl silane-polyoxyalkylene copolymer and any suitable catalyst such for example dibutyl tin dilaurate may be employed for the catalyst.

To the above materials is added about 30–40 weight percent acetone for blending the materials in a conventional well mixed slurry. Most of the acetone is removed by vacuum evaporation at or below 80° F. to produce a sprayable and spreadable paste, or dough, that may be pressed into sheets for application to a film substrate. After application of the composition to the substrate, it is desirable to effect further reduction in quantity of the plasticizing acetone by evaporation to one percent weight acetone or less. It has been found that large percentages of acetone in a paste or slurry caused accelerated decomposition of the azide component when stored. In order to obtain storage life beyond 30 days at room temperature, it has been found also necessary to exclude from the composition the commonly used basic catalyst for urethane polymerization such for example as triethylene diamine.

For use in formulations within the scope of this invention, the acyl azide compounds employed must be at least di-functional in acyl azide groups, the acid azide groups must undergo the Curtius rearrangements smoothly and at least nearly quantitatively in the temperature range 150–200° F. in a few hours or less; the di- or polyisocyanate product of the Curtius rearrangement must have suitable reactivity in urethane polymerizations and contribute desirable properties, such as chain stiffness, to the final polyurethane foam; and, both the azide structure and the isocyanate rearrangement product must have very low vapor pressure. Other desirable properties but not as essential as those mentioned hereinabove for the acid azide compounds include a high order of thermal stability in all structure exclusive of the azide groups, low shock sensitivity and, a minimum heat release per mole of the azide group in the Curtius rearrangement.

When compositions of the invention are foamed in the nearly adiabatic high vacuum environment simulating the space environment, radiant heat is absorbed to raise the foamable composition to reaction initiation and the azide in the composition rearranges to isocyanate with a considerable heat release. For example, in the case of 4,4'-diphenyl methane diacyl azide, measured heat release has been found to be about 224 calories per gram of azide. The heat release in the rearrangement of the azide causes the temperature of the composition to rise to 300° F. and above, at which time rapid decomposition of the blocked isocyanate occurs with resulting heat absorption. The isocyanate resulting from the azide rearrangement reacts very rapidly with hydroxyl groups of the polymer resin at the 300° F. and above level in the presence of the urethane polymerization catalyst with a resulting release of heat. During the course of these steps, which consume about 30 to 90 seconds, essentially all of the phenol freed from the blocked isocyanate vaporizes out of the foam. In the typical composition shown above phenol, which is freed and vaporizes, amounts to about 12 weight percent of the composition. This vaporization represents a considerable heat absorption and helps in limiting peak exotherm. The typical formulation shown in the example has a peak exotherm temperature of about 350° F. when foamed in a vacuum of 1–10 microns and out of contact with vacuum chamber walls at room temperature.

The essential adiabatic foaming process involves heating of the precoat to a temperature which is above that at which an isothermal balance is possible, e.g., 180° F., and a "runaway" rearrangement of azide ensues. The reaction rate is rapid and self-propagating although slow compared to explosions. The final foam temperature reaches some level between 300° F. and 400° F. due to exotherm. The peak exotherm temperature holds in a vacuum environment for less than a minute before cooling by radiation and other processes set in. The value of this adiabatic process for foaming is in its utilization of formulatons containing a selected, inert, storage-stable isocyanate derivative that requires a minimum temperature of around 300° F. for its rapid activation. Activation consists in decomposition of the phenol-blocked isocyanate and liberation of the isocyanate as a useful reactant and foamed polymer component. During the peak of the exotherm and for the first part of the cooling period, urethane polymerization rates are high and, in addition, are desirable catalyzed to assure that the final foam product is reasonably well cured.

A further advantage of the present novel formulations lies in the capability of supplying the considerable quantity of di-or polyisocyanates required for desirable high density cross-linking from two types of precursor compounds in combination. Since the one type (di- or polyacyl azide) gives a considerable heat release on rearrangement while the other type (blocked di- or polyisocyanate) absorbs heat in its dissociation, it is possible to adjust the ratio of the two types so as to predetermine the maximum exotherm temperature independently of the total amount of isocyanate supplied and of the resultant final foam composition. In rigidization of inflated and stressed solar collector membranes, it is necessary to set the maximum exotherm below a temperature at which mechanical failure or even melting of the stressed membrane or its seam adhesives might occur.

With isocyanate supplied from an additional initially inert ingredient, it is possble to reduce by half or more the azide requirements as dictated by the requirement for prior art derived isocyanate for proper foam cure. This is important, since the azide at present is a costly item that also exhibits considerable shock and thermal sensitivity. Precoat formulations with reduced azide content appear indifferent to friction and to shock, such as rifle bullet impact, and if initiated thermally give only a moderate heat release with predictable and controllable temperature rise. In view of the rapidity of the process, it appears that it should be possible to complete rigidization within the light portion of a single earth orbit when employing the present composition on an orbiting solar collector or concentrator. The peak exotherm temperature can readily be set high enough to insure rearrangement of all the azide components. In an isothermal process the rearrangement reaction tends to tail-off, extending inordinately the time to complete the reaction. Reaction rate theory and the experiments conducted with the above compositions agree on this point.

In useful operation of the present novel composition, a slurry of the composition may be sprayed onto the back side of an erectable space reflector or solar concentrator and with a clear plastic backing being applied over the composition the resulting concentrator package may be folded and compactly stored within the nose cone of a rocket for ultimately being placed in an earth orbit. After release from the nose cone of a suitable carrier vehicle, the solar concentrator is erected by expandable inflation or other suitable means and the sunlight appearing against the foamable composition raises the temperature of the composition to that required for initiation.

As mentioned hereinbefore, the temperature rise due to solar radiation will be at least in the range of 180° F. for a sufficient period of time to initiate and complete the foamable reaction. After the foaming recation is completed, the solar concentrator is permanently rigidized and will be relatively immune to micrometeorite puncture and the like which tend to limit the usefulness of prior art inflatable concentrators. In addition to applying the foamable composition as a spray coating on the solar concentrators and, as mentioned hereinbefore, the composition may be pressed into thin sheets or molded to form self-adherent sheets of the composition that are stable at ordinary room temperature conditions but when subjected to a thermal environment and temperature range of approximately 180° F. will undergo the foaming reaction and effect rigidization of the solar concentrator or the like. Sheets of the composition when pressed into a twenty-thousandths inch thickness will produce a polyurethane foam of approximately one-fourth inch thickness when the composition undergoes its foaming reaction. The composition may be stored in thin sheet form at cool temperatures of less than room temperature until time of desirable use. At approximately 32° F., the sheets of the composition are relatively brittle and do not adhere to each other. When ready for use, the sheets are brought to room temperature and become tacky, flexible, and self-adherent to most any surface. Thus, no adhesive is required to secure the foamable composition to the back side of solar reflectors or concentrators, although the use of a conventional adhesive is obviously considered within the scope of the present invention when so desired.

The sheets of composition may be readily cut by a paper cutter, scissors, or the like, into any suitable patterns for incremental application to nonflat surfaces such as the paraboloidal reflector shown in the referenced patent. Also, as mentioned hereinbefore, a sheet of suitable clear plastics material is paced over the self-adherent exposed surface of the composition sheets after application of the sheets to the reflector and prior to packaging the reflector in compressed condition within the carrier vehicle to prevent disruption and separation of the composition from the reflector during erection thereof. The clear plastics material readily permits transmission of solar radiation to the composition and does not interfere with the thermally actuated foaming reaction.

Although the invention has been described more specifically relating to space foaming compositions, it is readily apparent that the new and novel composition described herein may be used as a self-adherent coating for foldable emergency shelters, for use in other environments, unsinkable life rafts, as well as being used in folding fire doors or walls that are to be activated by heat here on earth or space ships or the like, when such need arises.

The invention is illustrated, but is not considered limited by the hereinbefore set forth specific examples, and it will be readily recognized that various modifications may be made thereto without departing from the scope of the invention. For example, the addition of a small amount of chopped silica or micro quartz fibers to the composition will have a strengthening effect on the foamed material. Since there are obviously many other modifications and variations in the present invention possible in the light of the above teachings, it is to be understood that within the scope of the appended claims, the invention may be practiced otherwise then as specifically described.

What is claimed as new and desired to be protected by Letters Patent of the United States is:

1. A storage-stable, thermally actuatable, foamable composition comprising the following ingredients:

| | Wt. percent |
|---|---|
| Hydroxyl terminated prepolymer | 55.4 |
| 4,4'-diphenyl methane diacyl azide | 16.5 |
| Bisphenol adduct of 4,4'-diphenyl methane diisocyanate | 26.0 |
| Surfactant | 1.6 |
| Catalyst | 0.5 |
| | 100.0 | wherein said prepolymer has viscosity in the range of 45,000 to 75,000 centipoise at 110° C. as measured by a Brookfield Viscosimeter and is produced by reacting 0.3 equivalent 4,4'-diphenyl methane diisocyanate with one equivalent of a polyether polyol which is an propylene oxide polymer of α-methyl glucoside having an OH equivalent weight of about 150, said surfactant being alkyl silane polyoxyalkylene copolymer and said catalyst being dibutyl tin dilaurate.

2. A method of utilizing the composition of claim 1 wherein the combined ingredients are mixed at room temperature with about 30–40 percent weight of acetone and blended into a well-mixed slurry, vacuum evaporating excess acetone from said slurry at a temperature of approximately 80° F., press molding said slurry into thin sheets of composition and substantially evaporating the remaining acetone from said sheets, said sheets of composition being storage-stable in the temperature range less than room temperature for an extended period and stable at room temperature for approximately 30 days.

3. The method of claim 2 wherein said sheets of composition are pliable and self-adherent to each other and dissimilar surfaces at room temperature and above and at temperatures in the range of 32° F. said sheets of composition are relatively brittle and show substantially no self-adherent characteristics.

4. A method of utilizing the composition of claim 1 wherein the combined ingredients are mixed at room temperature with about 30–40 percent weight of acetone and blended into a well mixed slurry, vacuum evaporating excess acetone from said slurry at a temperature of approximately 80° F. to render said slurry into a readily spreadable paste having a dough-like consistency that may be spread onto any desirable surface for subsequent thermally actuated foam generation, said paste and subsequent foam being self-adherent to said surface.

5. A method of utilizing the composition of claim 1 wherein the combined ingredients are mixed at room temperature with about 30–40 percent weight of acetone and blended into a well-mixed slurry, said slurry being readily sprayable by suitable spray mechanism and spraying a thin coating of said slurry onto a suitable surface, said slurry being self-adherent to said surface, vacuum evaporating substantially all of said acetone from said coating and therafter subjecting said coated surface to an elevated temperature environment whereby said coating undergoes a foaming reaction to provide a self-adherent polyurethane foam coating for said surface.

6. A storage-stable thermally activated foamable composition comprising:
a novel foamable base composition having the following ingredients by percentage weight:

| Ingredient | % |
|---|---|
| Hydroxyl terminated prepolymer | 55.4 |
| 4,4'-diphenyl methane diacyl azide | 16.5 |
| Bisphenol adduct of 4,4'-diphenyl methane diisocyanate | 26.0 |
| Alkyl silane polyoxyalkylene copolymer | 1.6 |
| Dibutyl tin dilaurate | 0.5 |
| | 100.0 | said prepolymer having a viscosity of from 45,000 to 75,000 centipoise as determined by a Brookfield Viscosimeter and being prepared by reacting 0.3 equivalent 4,4'-diphenyl methane diisocyanate with one equivalent of a polyether polyol which is an $\alpha$-methyl glucoside polymer of propylene oxide having an OH equivalent weight of about 150 and a reaction time of about two hours in the temperature range of 120–125° C.,
said base composition being blended into a well-mixed slurry by adding 30–40 weight percent acetone thereto and a substantial portion of said acetone being subsequently removed from said composition by vacuum evaporation at a temperature approximately 80° F. to thereby render said base composition into a spreadable paste of dough-like consistency.

References Cited
UNITED STATES PATENTS

| | | | |
|---|---|---|---|
| 3,190,844 | 6/1965 | Milone et al. | 260—2.5 |
| 3,190,844 | 6/1965 | Milone et al. | 260—2.5 |

DONALD E. CZAJA, Primary Examiner

M. B. FEIN, Assistant Examiner

U.S. Cl. X.R.

343—881, 914, 915